US009754018B2

(12) United States Patent
Olenick et al.

(10) Patent No.: US 9,754,018 B2
(45) Date of Patent: Sep. 5, 2017

(54) RENDERING INTERPRETER FOR VISUALIZING DATA PROVIDED FROM RESTRICTED ENVIRONMENT CONTAINER

(71) Applicant: Microsoft Technology Licensing, LLC, Redmond, WA (US)

(72) Inventors: Brad Olenick, Redmond, WA (US); Gilles C. J. A Zunino, Kirkland, WA (US); William Y. Moy, Bellevue, WA (US); Andrew Birck, Seattle, WA (US); Madhur Joshi, Kirkland, WA (US); Brendyn Alexander, Redmond, WA (US); Tom Cox, Redmond, WA (US); Ifeanyi Echeruo, Redmond, WA (US); Jean-Sebastien Goupil, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 143 days.

(21) Appl. No.: 14/231,869

(22) Filed: Apr. 1, 2014

(65) Prior Publication Data
US 2015/0095759 A1 Apr. 2, 2015

Related U.S. Application Data

(60) Provisional application No. 61/905,128, filed on Nov. 15, 2013, provisional application No. 61/884,743, (Continued)

(51) Int. Cl.
G06F 17/00 (2006.01)
G06F 17/30 (2006.01)
(Continued)

(52) U.S. Cl.
CPC ...... *G06F 17/30654* (2013.01); *G06F 3/0481* (2013.01); *G06F 3/0482* (2013.01);
(Continued)

(58) Field of Classification Search
None
See application file for complete search history.

(56) References Cited

U.S. PATENT DOCUMENTS 5,625,763 A 4/1997 Cirne
5,845,299 A 12/1998 Arora et al.
(Continued)

FOREIGN PATENT DOCUMENTS

EP 1615118 1/2006
WO WO 02097601 A2 12/2002

OTHER PUBLICATIONS

"International Preliminary Report on Patentability Issued in PCT Application No. PCT/US2014/057324", dated Aug. 5, 2015, 6 pages.
(Continued)

*Primary Examiner* — Keith Bloomquist
(74) *Attorney, Agent, or Firm* — Workman Nydegger

(57) ABSTRACT

At least some embodiments described herein refer to the user of a rendering interpreter that receives data object(s) from code executing within a restricted environment container (such as an IFrame). The restricted environment container prevents the code from adversely impacting the performance and consistency of the user interface system as a whole, and also prevents the code from adversely impacting the performance of code running in other restricted environment containers.

23 Claims, 3 Drawing Sheets

Related U.S. Application Data filed on Sep. 30, 2013, provisional application No. 61/905,111, filed on Nov. 15, 2013, provisional application No. 61/905,243, filed on Nov. 17, 2013, provisional application No. 61/905,114, filed on Nov. 15, 2013, provisional application No. 61/905,116, filed on Nov. 15, 2013, provisional application No. 61/905,129, filed on Nov. 15, 2013, provisional application No. 61/905,105, filed on Nov. 15, 2013, provisional application No. 61/905,247, filed on Nov. 17, 2013, provisional application No. 61/905,101, filed on Nov. 15, 2013, provisional application No. 61/905,119, filed on Nov. 15, 2013.

(51) Int. Cl.

| | |
|---|---|
| *G06F 9/44* | (2006.01) |
| *G06F 3/0484* | (2013.01) |
| *G06F 17/21* | (2006.01) |
| *G06F 3/0481* | (2013.01) |
| *G06F 3/0482* | (2013.01) |
| *G06F 3/0485* | (2013.01) |
| *G06F 3/0488* | (2013.01) |
| *G06F 9/48* | (2006.01) |

(52) U.S. Cl.
CPC .......... *G06F 3/0484* (2013.01); *G06F 3/0485* (2013.01); *G06F 3/0488* (2013.01); *G06F 3/04817* (2013.01); *G06F 3/04842* (2013.01); *G06F 8/34* (2013.01); *G06F 9/4443* (2013.01); *G06F 9/4445* (2013.01); *G06F 9/4856* (2013.01); *G06F 17/218* (2013.01); *G06F 17/30398* (2013.01)

(56) References Cited

U.S. PATENT DOCUMENTS

| | | |
|---|---|---|
| 5,886,694 A | 3/1999 | Breinberg et al. |
| 6,049,812 A | 4/2000 | Bertram et al. |
| 6,460,060 B1 | 10/2002 | Maddalozzo et al. |
| 6,473,891 B1 | 10/2002 | Shively |
| 6,750,887 B1 | 6/2004 | Kellerman et al. |
| 6,919,890 B2 | 7/2005 | Halstead, Jr. |
| 6,944,829 B2 | 9/2005 | Dando |
| 6,950,198 B1 | 9/2005 | Berarducci et al. |
| 6,950,993 B2 | 9/2005 | Breinberg |
| 7,062,475 B1 | 6/2006 | Szabo et al. |
| 7,243,335 B1 | 7/2007 | Andrew |
| 7,340,721 B1 | 3/2008 | Bailey |
| 7,401,289 B2 | 7/2008 | Lachhwani et al. |
| 7,417,644 B2 | 8/2008 | Cooper et al. |
| 7,536,672 B1 | 5/2009 | Ruehle |
| 7,577,938 B2 | 8/2009 | Bent et al. |
| 7,624,342 B2 | 11/2009 | Matveyenko et al. |
| 7,669,140 B2 | 2/2010 | Matthews et al. |
| 7,730,418 B2 | 6/2010 | Wang et al. |
| 7,769,794 B2 | 8/2010 | Moore et al. |
| 7,823,077 B2 | 10/2010 | Kurtz et al. |
| 7,933,632 B2 | 4/2011 | Flynt et al. |
| 7,954,064 B2 | 5/2011 | Forstall et al. |
| 8,095,412 B1 | 1/2012 | Zias et al. |
| 8,181,156 B1 | 5/2012 | Bobykin |
| 8,195,646 B2 | 6/2012 | Evans et al. |
| 8,316,323 B2 | 11/2012 | Saraiya et al. |
| 8,321,847 B1 | 11/2012 | Garvin et al. |
| 8,365,138 B2 | 1/2013 | Iborra et al. |
| 8,453,065 B2 | 5/2013 | Chaudhri et al. |
| 8,533,667 B2 | 9/2013 | Alexander et al. |
| 8,543,824 B2 | 9/2013 | Louch et al. |
| 8,856,681 B2 | 10/2014 | Rodden et al. |
| 8,869,027 B2 | 10/2014 | Louch et al. |
| 8,990,199 B1 | 3/2015 | Ramesh |
| 9,152,616 B2 | 10/2015 | Ying et al. |
| 9,195,477 B1 | 11/2015 | Spencer |
| 9,244,661 B1 | 1/2016 | Garvin et al. |
| 9,244,971 B1 | 1/2016 | Kalki |
| 2002/0105658 A1 | 8/2002 | Jackson et al. |
| 2002/0138637 A1* | 9/2002 | Suzuoki ............... G06F 9/4862 709/230 |
| 2002/0147963 A1 | 10/2002 | Lee |
| 2003/0011638 A1 | 1/2003 | Chung |
| 2003/0058286 A1 | 3/2003 | Dando |
| 2003/0090504 A1 | 5/2003 | Brook et al. |
| 2003/0137540 A1 | 7/2003 | Klevenz et al. |
| 2003/0210274 A1 | 11/2003 | Subramanian et al. |
| 2004/0098390 A1 | 5/2004 | Bayliss et al. |
| 2004/0225581 A1 | 11/2004 | Wyle et al. |
| 2004/0243576 A1 | 12/2004 | Shrivastava et al. |
| 2005/0088410 A1 | 4/2005 | Chaudhri |
| 2005/0125727 A1 | 6/2005 | Ramachandran et al. |
| 2005/0131889 A1 | 6/2005 | Bennett et al. |
| 2005/0177586 A1 | 8/2005 | Chen |
| 2005/0188349 A1* | 8/2005 | Bent ..................... G06F 8/38 717/106 |
| 2006/0048071 A1 | 3/2006 | Jarrett et al. |
| 2006/0053096 A1 | 3/2006 | Subramanian et al. |
| 2006/0190833 A1 | 8/2006 | SanGiovanni et al. |
| 2006/0253799 A1 | 11/2006 | Montroy |
| 2006/0282771 A1 | 12/2006 | Vinci |
| 2007/0024646 A1 | 2/2007 | Saarinen et al. |
| 2007/0027851 A1 | 2/2007 | Kruy |
| 2007/0033522 A1 | 2/2007 | Lin et al. |
| 2007/0094326 A1 | 4/2007 | Gupta |
| 2007/0136579 A1* | 6/2007 | Levy ..................... H04L 63/102 713/168 |
| 2007/0156740 A1 | 7/2007 | Leland et al. |
| 2007/0162439 A1 | 7/2007 | Petropoulos et al. |
| 2007/0209023 A1 | 9/2007 | Nakagawa et al. |
| 2007/0233854 A1 | 10/2007 | Bukovec et al. |
| 2007/0234195 A1 | 10/2007 | Wells |
| 2007/0288667 A1 | 12/2007 | Kamata et al. |
| 2008/0065974 A1 | 3/2008 | Campbell |
| 2008/0066080 A1 | 3/2008 | Campbell |
| 2008/0109714 A1 | 5/2008 | Kumar et al. |
| 2008/0109785 A1 | 5/2008 | Bailey |
| 2008/0144119 A1 | 6/2008 | Otake |
| 2008/0177994 A1 | 7/2008 | Mayer |
| 2008/0201401 A1 | 8/2008 | Pugh et al. |
| 2008/0235618 A1 | 9/2008 | Sadouski |
| 2008/0313648 A1* | 12/2008 | Wang .................... G06F 21/53 719/315 |
| 2008/0320413 A1 | 12/2008 | Oshiro et al. |
| 2009/0037605 A1 | 2/2009 | Li |
| 2009/0055432 A1 | 2/2009 | Smith |
| 2009/0106227 A1 | 4/2009 | Davis |
| 2009/0119257 A1 | 5/2009 | Waters |
| 2009/0254337 A1 | 10/2009 | Sprecher et al. |
| 2009/0254822 A1 | 10/2009 | Greenlee |
| 2009/0292989 A1 | 11/2009 | Matthews |
| 2009/0319939 A1 | 12/2009 | Danton et al. |
| 2010/0005053 A1 | 1/2010 | Estes |
| 2010/0058227 A1 | 3/2010 | Danton et al. |
| 2010/0115053 A1 | 5/2010 | Ryu et al. |
| 2010/0174774 A1 | 7/2010 | Kern et al. |
| 2010/0229115 A1 | 9/2010 | Augustine et al. |
| 2010/0251143 A1 | 9/2010 | Thomas et al. |
| 2010/0262905 A1 | 10/2010 | Li |
| 2010/0269096 A1 | 10/2010 | Araya |
| 2010/0287530 A1 | 11/2010 | MacLean et al. |
| 2010/0306696 A1 | 12/2010 | Groth et al. |
| 2011/0173537 A1 | 7/2011 | Hemphill |
| 2011/0289546 A1* | 11/2011 | Pieczul ............... H04L 63/1408 726/1 |
| 2012/0005581 A1 | 1/2012 | Turner |
| 2012/0023442 A1 | 1/2012 | Oshiro et al. |
| 2012/0030591 A1* | 2/2012 | Demant ................ G06F 9/4443 715/763 |
| 2012/0079379 A1 | 3/2012 | Hathaway et al. |
| 2012/0124555 A1 | 5/2012 | Bannoura et al. |
| 2012/0151361 A1 | 6/2012 | Burton |
| 2012/0167008 A1 | 6/2012 | Zaman et al. |
| 2012/0191502 A1 | 7/2012 | Gross et al. |

(56) References Cited

U.S. PATENT DOCUMENTS

| | | | |
|---|---|---|---|
| 2012/0206498 | A1 | 8/2012 | Kai et al. |
| 2012/0246487 | A1 | 9/2012 | Gu et al. |
| 2012/0254723 | A1 | 10/2012 | Kasa et al. |
| 2012/0324422 | A1 | 12/2012 | Chartier et al. |
| 2012/0330668 | A1 | 12/2012 | Verna et al. |
| 2012/0331441 | A1* | 12/2012 | Adamson ............ G06F 11/3664 717/102 |
| 2013/0086508 | A1 | 4/2013 | Oguz |
| 2013/0120295 | A1 | 5/2013 | Kim et al. |
| 2013/0139056 | A1 | 5/2013 | Borkowski et al. |
| 2013/0145314 | A1 | 6/2013 | Dhar et al. |
| 2013/0191880 | A1* | 7/2013 | Conlan ................... G06F 21/00 726/1 |
| 2013/0219263 | A1 | 8/2013 | Abrahami |
| 2013/0247006 | A1 | 9/2013 | Trowbridge |
| 2013/0300758 | A1 | 11/2013 | Yerli |
| 2014/0258970 | A1 | 9/2014 | Brown et al. |
| 2014/0298253 | A1 | 10/2014 | Jin et al. |
| 2014/0366157 | A1* | 12/2014 | Yancey ................... G06F 21/62 726/28 |
| 2015/0058709 | A1 | 2/2015 | Zaletel |
| 2015/0149937 | A1 | 5/2015 | Khalid et al. |

OTHER PUBLICATIONS

Second Written Opinion Issued in PCT Patent Application No. PCT/US2014/057321, dated Aug. 7, 2015, 6 Pages.
"W3C Technical Reports", Published Nov. 11, 1999, 8 Pages. Available at <<http://www.w3.org/Consortium/Process/Process-19991111.tr.html#RecsCR>>.
Second Written Opinion Issued in PCT Application No. PCT/US2014/057940, dated Aug. 27, 2015, 8 Pages.
"International Search Report and Written Opinion Received for PCT Patent Application No. PCT/US2014/057323", dated Dec. 10, 2014, 8 Pages.
"International Search Report & Written Opinion Received for PCT Patent Application No. PCT/US2014/057940", dated Jan. 12, 2015, 10 Pages.
Kumar, Dhananjay, "Live Tiles in XAML based Windows 8 Metro Application", Published on: Mar. 29, 2012, Available at: http://debugmode.net/2012/03/29/lives-tiles-in-xaml-based-windows-8-metro-application/.
Thurrott, Paul, "Windows 8 Feature Focus: Live Tiles", Published on: Jan. 28, 2013, Available at: http://winsupersite.com/article/windows8/windows-8-feature-focus-live-tiles-144652.
"International Preliminary Report on Patentability Issued in PCT Application No. PCT/US2014/057938", dated Sep. 17, 2015, 7 Pages.
International Search Report and Written Opinion Issued in PCT Application No. PCT/US2014/057324, dated Jun. 24, 2015, 5 Pages.
Second Written Opinion Issued in PCT Application No. PCT/US2014/057939, dated Jun. 24, 2015, 4 Pages.
"ACC97: How to Modify Query Properties in Microsoft Access", Available at least as early as Jan. 13, 2015, Available at <<http://support.microsoft.com/kb/304451>>.
Brydon, Michael, "Access Tutorial: Parameter Queries", Published Aug. 1997, Available at <<http:/ fisher.osu.edu/~muhanna.1/837/MSAccess/tutorials/param.pdf>>.
International Search Report and Written opinion Issued in PCT Patent Application No. PCT/US2014/057322, dated Jan. 22, 2015, 9 Pages.
International Search Report and Written Opinion Issued in PCT Application No. PCT/US2014/057938, dated Feb. 6, 2015, 11 Pages.
International Search Report & Written Opinion for PCT Patent Application No. PCT/US2014/057321, dated Feb. 6, 2015, 8 Pages.
W3c: "HTML5—A Vocabulary and Associated APIs for HTML and XHTML", Published Aug. 6, 2013, Available at <<http://www.w3.org/TR/2013/CR-html5-20130806/embedded-content-0.html#the-iframe-element>>.

"International Search Report and Written Opinion Received for PCT patent Application No. PCT/US2014/057939" dated Dec. 1, 2014, 8 pages.
"International Search Report and Written Opinion Received for PCT patent Application No. PCT/US2014/057324" dated Dec. 1, 2014, 8 pages.
"International Preliminary Report on Patentability Issued in PCT Application No. PCT/US2014/057321", dated Dec. 4, 2015, 7 Pages.
"International Preliminary Report on Patentability Issued in PCT Application No. PCT/US2014/057939", dated Dec. 4, 2015, 5 Pages.
Office Action dated Feb. 1, 2016 cited in U.S. Appl. No. 14/231,880.
"International Preliminary Report on Patentability Issued in PCT Application No. PCT/US2014/057938", dated Dec. 23, 2015, 8 Pages.
"International Preliminary Report on Patentability Issued in PCT Application No. PCT/US2014/057323", dated Dec. 23, 2015, 7 Pages.
"International Preliminary Report on Patentability Issued in PCT Application No. PCT/US2014/057940", dated Dec. 23, 2015, 9 Pages.
Office Action dated Feb. 16, 2016 cited in U.S. Appl. No. 14/231,883.
Office Action dated Feb. 26, 2016 cited in U.S. Appl. No. 14/231,891.
"International Preliminary Report on Patentability Issued in PCT Patent Application No. PCT/US2014/057322", dated Jan. 12, 2016, 6 Pages.
U.S. Appl. No. 14/231,883, dated May 24, 2016, Office Action.
U.S. Appl. No. 14/231,862, dated May 19, 2016, Office Action.
U.S. Appl. No. 14/231,846, dated Jun. 14, 2016, Office Action.
U.S. Appl. No. 14/231,897, dated Jun. 2, 2016, Office Action.
U.S. Appl. No. 14/231,905, dated Jun. 14, 2016, Office Action.
Notice of Allowance dated Jun. 20, 2016 cited in U.S. Appl. No. 14/231,891.
Notice of Allowance dated Aug. 29, 2016 cited in U.S. Appl. No. 14/231,883.
Office Action dated Sep. 6, 2016 cited in U.S. Appl. No. 14/231,880.
Office Action dated Sep. 9, 2016 cited in U.S. Appl. No. 14/231,873.
Office Action dated Sep. 16, 2016 cited in U.S. Appl. No. 14/231,897.
Office Action dated Sep. 23, 2016 cited in U.S. Appl. No. 14/231,846.
Office Action dated Nov. 2, 2016 cited in U.S. Appl. No. 14/231,905.
Office Action dated Nov. 17, 2016 cited in U.S. Appl. No. 14/231,912.
Office Action dated Jan. 11, 2017 cited in U.S. Appl. No. 14/231,917.
Office Action dated Feb. 21, 2017 cited in U.S. Appl. No. 14/231,862.
Office Action dated Feb. 24, 2017 cited in U.S. Appl. No. 14/231,897.
Office Action dated Apr. 3, 2017 cited in U.S. Appl. No. 14/231,880.
Ray, Li, France, Kim "Using UML to Visualize Role-Based Access Control Constraints" published Jun. 2004. Computer Science Dept. Colorado State University Fort Collings, CO—SACMAT'04, Yorktown Heights, New York, USA.
Notice of Allowance dated Mar. 29, 2017 cited in U.S. Appl. No. 14/231,905.
European Office Action issued in EPO Patent Application No. 14783733.0 dated May 22, 2017.
U.S. Appl. No. 14/231,873, dated May 17, 2017, Office Action.
Office Action Issued in Chile Patent Application No. 729-2016, dated May 17, 2017, 6 Pages.
U.S. Appl. No. 14/231,862, dated Jun. 14, 2017, Notice of Allowance.
U.S. Appl. No. 14/231,897, dated Jun. 16, 2017, Notice of Allowance.
U.S. Appl. No. 14/231,912, dated Jun. 16, 2017, Office Action.

(56) References Cited

OTHER PUBLICATIONS

U.S. Appl. No. 14/231,846, dated Jul. 12, 2017, Office Action.

* cited by examiner

US 9,754,018 B2

RENDERING INTERPRETER FOR VISUALIZING DATA PROVIDED FROM RESTRICTED ENVIRONMENT CONTAINER

CROSS-REFERENCE TO RELATED APPLICATIONS

This application claims the benefit of each of the following provisional patent applications, and each of the following provisional patent applications are incorporated herein by reference in their entirety:
1. U.S. Provisional Application Ser. No. 61/905,243, filed Nov. 17, 2013;
2. U.S. Provisional Application Ser. No. 61/884,743, filed Sep. 30, 2013;
3. U.S. Provisional Application Ser. No. 61/905,111, filed Nov. 15, 2013;
4. U.S. Provisional Application Ser. No. 61/905,114, filed Nov. 15, 2013;
5. U.S. Provisional Application Ser. No. 61/905,116, filed Nov. 15, 2013;
6. U.S. Provisional Application Ser. No. 61/905,129, filed Nov. 15, 2013;
7. U.S. Provisional Application Ser. No. 61/905,105, filed Nov. 15, 2013;
8. U.S. Provisional Application Ser. No. 61/905,247, filed Nov. 17, 2013;
9. U.S. Provisional Application Ser. No. 61/905,101, filed Nov. 15, 2013;
10. U.S. Provisional Application Ser. No. 61/905,128, filed Nov. 15, 2013; and
11. U.S. Provisional Application Ser. No. 61/905,119, filed Nov. 15, 2013.

BACKGROUND

The primary purpose of an IFrame is to render content (hereinafter "untrusted content") within a particular window of a larger user interface in a manner that the window looks like an integrated part of the larger user interface. The content is "untrusted" in that it is generated by untrusted code (often script). The IFrame provides an isolation function that prevents the script from doing harmful actions to objects outside of the IFrame. After all, the script provided within an IFrame is often provided by a third-party entity.

There is typically one IFrame per window. The main application content is typically displayed in one IFrame. Furthermore, there is a dedicated IFrame for each window having untrusted content. In conventional user interface systems, there might be one or two IFrames (other than the primary IFrame for the main application content) that operate to render untrusted content on respective portions of the display. For instance, in a browser application, the main browser display might be rendered by one IFrame. There might be a small stock update window in another corner of the display that regularly updates a few designated stock prices. The content of that small window is also driven by a separate IFrame. Thus, in conventional approaches, there is a one-to-one correspondence between IFrames and windows that display untrusted content.

BRIEF SUMMARY

At least some embodiments described herein refer to the user of a rendering interpreter that receives data object(s) (such as a view model) from code executing within a restricted environment container (such as an IFrame). The restricted environment container prevents the code from adversely impacting the performance and consistency of the user interface system as a whole, and also prevents the code from adversely impacting the performance of code running in other restricted environment containers.

The rendering interpreter processes the data object(s) received from the restricted environment container, and exposes the resulting data to a user interface element that is external to the restricted environment container. The resulting data is structured such that the user interface element visualizes at least some of the resulting data. The code is thereby permitted to safely project content into the user interface element.

In some embodiments, a single restricted environment container may contain multiple code elements, each responsible for projecting content into a corresponding user interface element. Accordingly, there is no longer a one-to-one mapping between content windows and restricted environment containers. Instead, in the context in which the user interface application is extended by multiple other entities, a given application extension may be allocated a single restricted environment container, regardless of how many content windows that extension populates. Code associated with that extension then executes within the corresponding restricted environment container. Thus, far more elements of dynamic content may be rendered on a user interface using a smaller number of restricted environment containers. Accordingly, a user interface system may safely gain significant dynamic content contributions from other providers.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
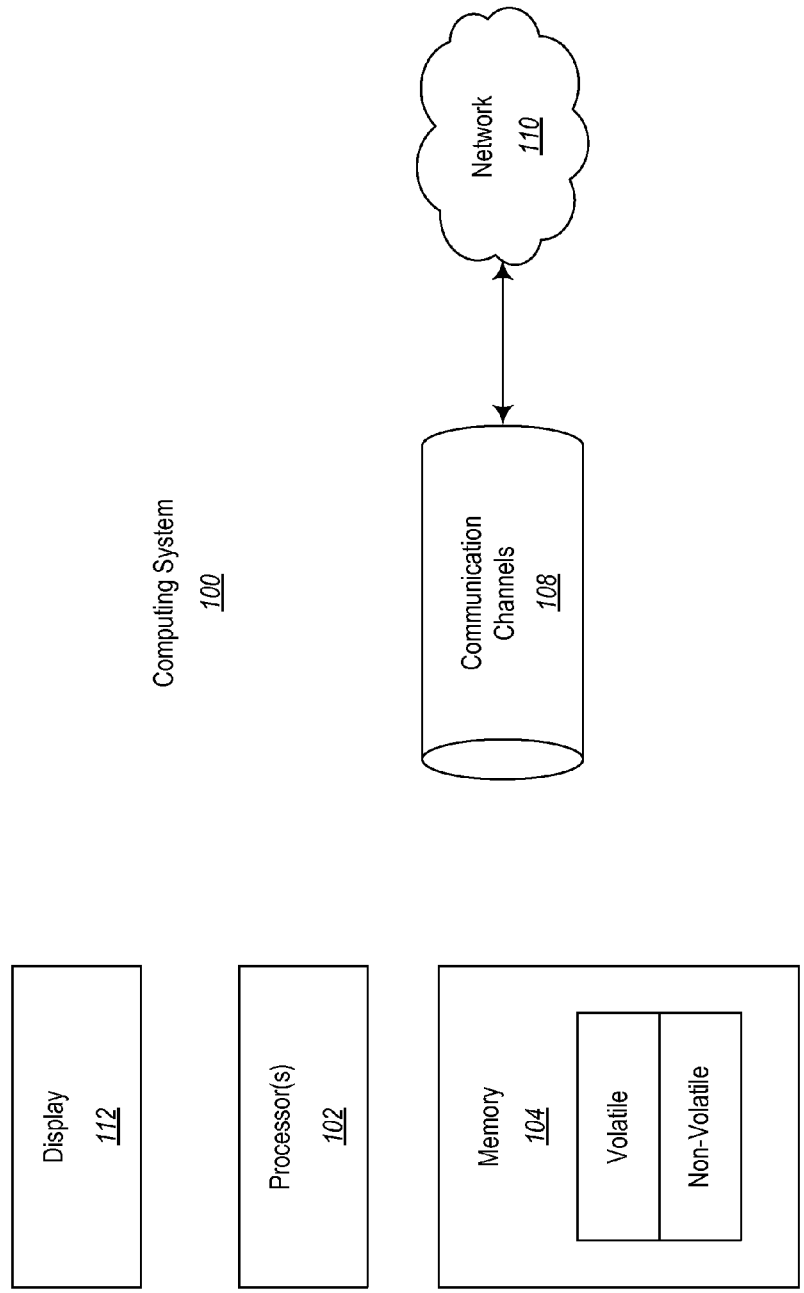
FIG. 1 illustrates an example computing system in which the principles described herein may be employed.

At least some embodiments described herein relate to a computing system that includes a user interface system for presenting a user interface having a variety of user interface elements. While the user interface system presents the user interface elements as a container, at least some of the user interface elements may be populated by applications that extend the features of the user interface elements. For instance, the user interface system might be a web application. The applications that extend the features of the browser application might be extensions to the web application.

In order that there is safe and secure isolation between the applications and the user interface system, and between the applications themselves, each application has a dedicated restricted environment container (e.g., an undisplayed iFrame). Each user interface element also includes a rendering interpreter, each configured to process any received data objects (such as a view model) from corresponding code running in a restricted environment container and expose resulting data to a corresponding user interface element. The resulting data provided by any given rendering interpreter is structured such that the corresponding user interface element visualizes at least some of the resulting data, to thereby allow the corresponding code to project content into the corresponding user interface element. Such providing of resulting data will also be referred to hereinafter as "projecting content".

In the case of the received data object(s) being the rendering interpreter, a copy of the view model may be contained within a corresponding restricted environment container, and another synchronized copy of the same view model may be contained with the user interface system execution environment. As changes are made to one copy of the view model, they are propagated to the other copy of the view model using messaging. Accordingly, the code for an application running in a restricted environment container may project visualizations into appropriate user interface elements without the risk of harm to the user interface system or other applications. Furthermore, since the rendering interpreters can enforce rules on how content is projected into the user interface element, the rendering interpreter tends to provide a consistent look and feel of the user interface. Likewise, when changes are made to the visualization, those changes may be propagated back to the underlying data within the restricted environment container.

Some introductory discussion of a computing system will be described with respect to FIG. 1. Then, example user interfaces, methods and supporting architectures will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

The computing system 100 also includes a display 112 on which a user interface, such as the user interfaces described herein, may be rendered. Such user interfaces may be generated in computer hardware or other computer-represented form prior to rendering. The presentation and/or rendering of such user interfaces may be performed by the computing system 100 by having the processing unit(s) 102 execute one or more computer-executable instructions that are embodied on one or more computer-readable media. Such computer-readable media may form all or a part of a computer program product.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer.

Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
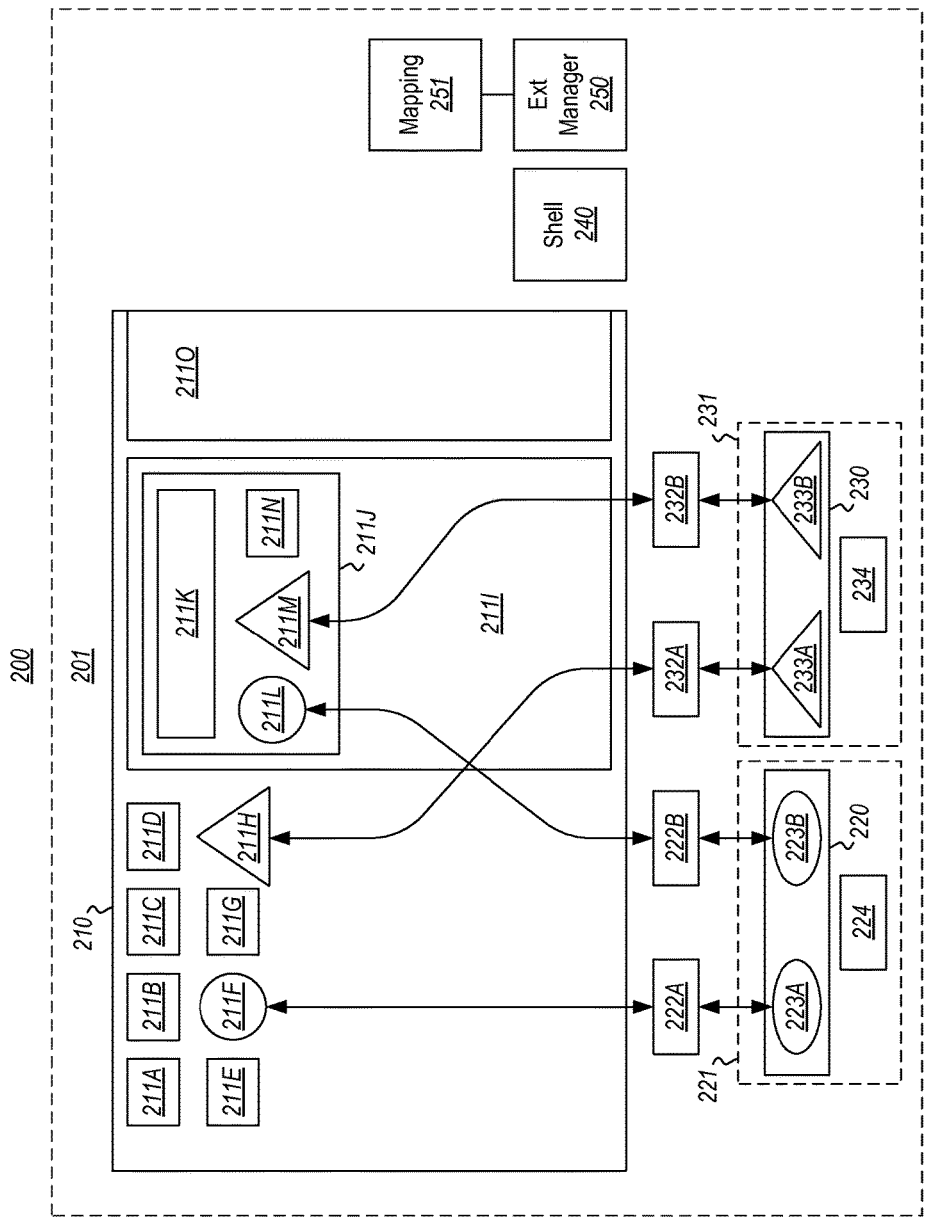
FIG. 2 illustrates environment that includes a user interface system that may operate with the computing system of FIG. 1.

FIG. 2 illustrates an environment 200 that may operate with the computing system 100 of FIG. 1. The environment 200 includes a user interface system 201 that presents a user interface 210. The principles described herein may operate using any user interface that has multiple user interface elements no matter what those user interface elements are, or how distributed. For purposes of example, the user interface 210 has multiple user interface elements 211A through 211O.

There are one or more applications that extend the features of the user interface system (hereinafter also referred to as "extension applications") and that operate within the user interface system. However, the code for each extension application runs within a dedicated restricted environment container that is dedicated to running code for that extension application. This prevents any given extension application from harming or disrupting the consistency of the user interface system, or harming the performance of another application. For instance, in FIG. 2, there are two extension applications 220 and 230 running within corresponding dedicated restricted environment containers 221 and 231.

Although not required, the restricted environment containers 221 may be a container usually provisioned to display dynamic content using code executed therein. For instance, each restricted environment container may be, for instance, an IFrame. However, the IFrame is configured so as not to render any displayable content, but just to run code therein, thereby taking advantage of the isolation characteristics of the IFrame.

Typically, in dynamic web pages, there is one IFrame per user interface element when untrusted code within the IFrame is executed to generate that content. However, this is not scalable when the number of such user interface elements (and corresponding IFrames) rises, as the memory resources of the system become overwhelmed. This would be especially true for a user interface that allows other untrusted applications to populate user interface elements.

In accordance with the principles described herein, IFrames are apportioned one per extension application, as opposed to one per dynamic user interface element. Accordingly, since any given application extension may populate many more than just a single dynamic interface element with dynamic content, this significantly reduces the number of IFrames needed for user interfaces, thereby facilitating user interfaces with large numbers of user interface elements that contain dynamic content.

For instance, in the case of FIG. 2, there are four user interface elements illustrated as having content driven by execution of untrusted extension applications, including user interface elements 211F, 211H, 211L and 211M. Using the conventional approach, this would require four IFrames. However, this number has been reduced to two IFrames (corresponding to restricted environment containers 221 and 231) in FIG. 2. The percentage reduction in IFrame usage can be more significant in a complex user interface with many user interface elements populated by only a few extension applications.

The user interface system 201 manages a mapping 251 between a given extension application and the user interface element that the application populates. For instance, in FIG. 2, the mapping 251 would map an identification of the extension application 220 to the identification of the user interface elements 211F and 211L. The mapping 251 would also map an identification of the extension application 230 to the identification of the user interface elements 211H and 211M.

A container management component (or an "extension manager component") 250 has access to the mapping, and is responsible for creating and removing restricted environment containers. The container management component creates a new restricted environment container when a user interface element is to be displayed that is to be populated by code from a particular extension application for which there is not yet a restricted environment container. In addition, the container management component loads the corresponding extension application into the newly created restricted environment component. On the other hand, the container management component 250 releases (i.e., removes) a restricted environment container corresponding to a particular application when the computing system no longer has any user interface state corresponding to any user interface elements that are populated by the particular application. The shell 240 is responsible for adding and removing user interface elements and notifies the container management component 250 of these events.

Towards the goal of managing a small number of restricted environment containers sufficient to render only those user interface elements that are on screen (and perhaps a little more to facilitate smoother scrolling or other navigation), a virtualization component (which may be part of the shell 240 in FIG. 2) releases user interface state of a user interface element from the computing system under at least some circumstances when a user interface element is no longer displayed on the display. This too significantly decreases the use of restricted environment containers to a predictable number that can be managed explicitly by the user interface system.

The user interface system is responsible for exposing the user interface element in a manner that they can become populated. For instance, the shell 240 determines when a new user interface element is to be rendered, and obtains the template (e.g., markup) for the user interface element. The shell 240 then calls into the appropriate extension application to populate the user interface element. The population occurs by the corresponding code providing one or more data objects (e.g., a view model) to a corresponding rendering interpreter. The rendering interpreter then sends the resulting data sent from the view model to the corresponding user interface element, wherein it is used to populate the user interface element.

The application 220 includes code 223A and code 223B, which are responsible for populating respective user interface elements 211F and 211L, and may operate based on application data 224. The application 230 includes code 233A and code 233B, which are responsible for populating respective user interface elements 211H and 211M, and may operate using application data 234. In one embodiment, each illustrated item of code may be a single control, or perhaps multiple controls, or even complex controls that are hierarchically structured, or depend on the output from other controls. The controls might have been sanitized and approved for use by the user interface system. For instance, for intrinsic controls offered by the user interface system, the system provider ensures safe operation. On the other hand, extension applications offer markup templates that are sanitized by the shell 240. The extension manager 250 may have responsibility for loading the code into the appropriate application when and/or after the corresponding application is loaded into the respective restricted environment container.

As previously mentioned, the results of execution of this code are not provided directly into the execution environment of the user interface system 201. Instead, each code has a corresponding rendering interpreter, which restricts the operations and data that can be performed by the code. This permits the user interface system 201 and other extension applications to be protected from unintended harmful consequence of the extension application, or even from rogue extension applications.

When the code is to provide content to the respective user interface element, the code executes and provides one or more resulting data objects to its respective rendering interpreter. For instance, in FIG. 2, code 223A, 223B, 233A and 233B having corresponding rendering interpreters 222A, 222B, 232A and 232B. As an example, the rendering interpreters might each be view models.

Each rendering interpreter is configured to process any received data objects from corresponding code running in a restricted environment container, and expose resulting data to its corresponding user interface element. The resulting data is structured such that the corresponding user interface element visualizes at least some of the resulting data, to thereby allow the corresponding code to project content into the corresponding user interface element.

Figure 3:
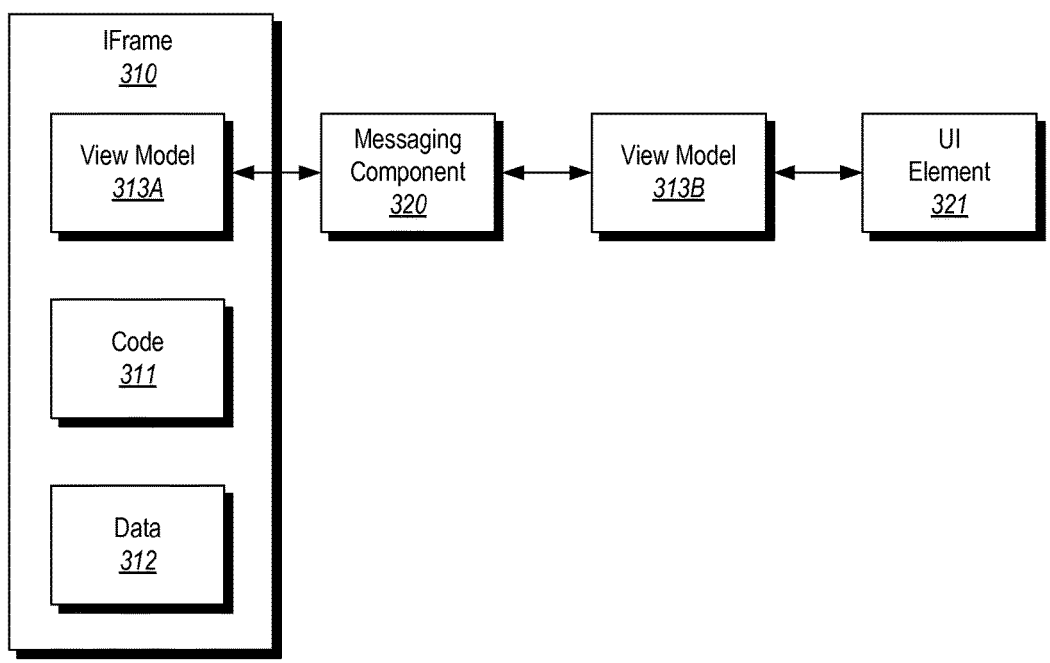
FIG. 3 illustrates a mechanism in which code operates on data within an IFrame, and in which data is transferred between the IFrame and a user interface element.

In the embodiment in which the IFrame is used as a restricted environment container, and the received one or more data objects is a view model, there may be two copies of the view model, one operating within the IFrame and one operating openly within the user interface system environment. FIG. 3 illustrates a mechanism 300 in which code 311 operates on data 312 within an IFrame 310 and provides the resulting objects as a view model 313A that is also contained within the IFrame 310. There is also a copy 313B of the view model operating within the user interface system execution environment (which incidentally, might also be an IFrame). It is that copy 313B which the rendering interpreter accesses to thereby populate the corresponding user interface element 321 corresponding to the code 311.

The copies 313A and 313B of the view model are kept synchronized by sending messages to and receiving messages from a messaging component 320. For instance, when the code 311 alters the view model 313A within the IFrame 310, the messaging component 320 detects the change, and likewise messages the view model 313B operating outside the IFrame 310. The rendering interpreter may then access the view model 313B to project content into the user interface element 321. In reverse, if a change is made to the state of the user interface element 321, that change is reflected within the view model 313B outside of the IFrame 310. The view model 313B then messages the messaging component 320. The messaging component 320 messages the view model 313A inside the IFrame 310 within the altered object(s). The code 311 then accesses the view model 313A, and the application data 312 is updated.

Accordingly, embodiments described herein allow a user interface system to be enriched with the contributions of several application extensions, without those application extensions adversely affecting consistency in the user interface system, and without the application extensions harming functionality of the user interface system or each other.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more computer readable storage media storing computer executable instructions;
   one or more processors which, when executing the computer executable instructions, cause the computer system to be configured with an architecture for a computing environment for apportioning restricted environment containers (such as IFrames) on the basis of one restricted environment container per extension application, as opposed to one restricted environment container per dynamic interface element, so that any given application extension may populate many more than just a single dynamic interface element with content; and
   wherein the architecture for the computing environment comprises:
      a user interface system comprising a plurality of dynamic interface elements;
      a plurality of restricted environment containers each running untrusted code for a corresponding extension application so as to provide a restricted environment for each extension application in which the untrusted code runs, each restricted environment container using application data for the extension application to generate a plurality of data objects, and the restricted environment containers being apportioned on the basis of one restricted environment container per extension application, as opposed to one restricted environment container per dynamic interface element; and
- a separate rendering interpreter for each given data object processed by a restricted environment container, and each rendering interpreter processing and projecting the corresponding data object to a single dynamic interface element of the user interface system.

2. The computer system in accordance with claim 1, wherein the restricted environment container is suitable for displaying content when the content is reconfigured.

3. The computer system in accordance with claim 1, wherein the restricted environment container is an IFrame, and wherein data objects received by the dynamic interface elements are view models.

4. The computer system in accordance with claim 3, wherein a copy of the one or more data objects is maintained within a corresponding restricted environment container, and a synchronized second copy of the one or more data objects is maintained within the user interface system.

5. The computer system in accordance with claim 1, wherein the code that runs for a given extension application extends features of the user interface system, and wherein at least one of the dynamic interface elements of the user interface system is populated by the code that runs for the given extension application.

6. The computer system in accordance with claim 1, wherein the architecture for the computing environment further comprises:
- a mapping component that manages mapping between data objects provided by the restricted environment container of a given extension application and a plurality of dynamic interface elements; and
- a shell component that adds and removes dynamic interface elements to the user interface system.

7. The computer system in accordance with claim 6, wherein the architecture for the computing environment further comprises:
- a container management component that instantiates a new restricted environment container when a user interface element is to be displayed that is to be populated by code from a particular extension application for which there is not yet a restricted environment container; and
- wherein the shell component notifies the container management component when a dynamic interface element is added or removed from the user interface system.

8. The computer system in accordance with claim 7, wherein the architecture for the computing environment further comprises:
- a virtualization component that releases user interface state of a dynamic interface element when the dynamic interface element is no longer displayed on the user interface system, but is still available at the user interface system.

9. The computer system in accordance with claim 8, wherein the container management component releases a restricted environment container corresponding to a particular extension application when the user interface system no longer has any user interface state corresponding to any dynamic interface element that is populated by the particular extension application.

10. The computer system in accordance with claim 1, wherein at least one of the dynamic interface elements of the user interface system receiving a projected data object is a smaller window contained within a larger window, and wherein at least one other dynamic interface element of the user interface system receiving a projected data object is not contained within any other window of the user interface system.

11. A computer-implemented method performed by one or more processors when executing computer-executable code, the computer-implemented method comprising:
running within a restricted environment container untrusted code for an extension application so as to provide a restricted environment in which the untrusted code runs;
generating a plurality of data objects using application data for the extension application,
processing the plurality of data objects with a separate rendering interpreter provided for each given data object; and
projecting the processed data objects from each said separate rendering interpreter to a corresponding single dynamic interface element of the user interface system, with each restricted environment container being apportioned to a single extension application, and each separate rendering interpreter is apportioned to a single dynamic interface element of the user interface system, as opposed to individually apportioning restricted environment containers to a single dynamic interface element.

12. The computer-implemented method in accordance with claim 11, wherein the restricted environment container is an IFrame, and wherein data objects received by the dynamic interface elements are view models.

13. The computer-implemented method in accordance with claim 12, wherein a copy of the one or more data objects is maintained within a corresponding restricted environment container, and a synchronized second copy of the one or more data objects is maintained within the user interface system.

14. The computer-implemented method in accordance with claim 11, further comprising:
adding and removing dynamic interface elements to the user interface system.

15. The computer-implemented method in accordance with claim 14, further comprising:
instantiating a new restricted environment container when a user interface element is to be displayed that is to be populated by code from a particular extension application for which there is not yet a restricted environment container.

16. The computer-implemented method in accordance with claim 15, further comprising:
releasing user interface state of a dynamic interface element when the dynamic interface element is no longer displayed on the user interface system, but is still available at the user interface system.

17. The computer-implemented method in accordance with claim 16, further comprising:
releasing a restricted environment container corresponding to a particular extension application when the user interface system no longer has any user interface state corresponding to any dynamic interface element that is populated by the particular extension application.

18. A computer program product comprising one or more computer storage media storing computer executable instructions which, when executed by one or more processors, cause a computer-implemented method to be performed, and wherein the computer-implemented method comprises:

running within a restricted environment container untrusted code for an extension application so as to provide a restricted environment in which the untrusted code runs;

generating a plurality of data objects using application data for the extension application, processing the plurality of data objects with a separate rendering interpreter provided for each given data object; and projecting the processed data objects from each said separate rendering interpreter to a corresponding single dynamic interface element of the user interface system, with each restricted environment container being apportioned to a single extension application, and each separate rendering interpreter is apportioned to a single dynamic interface element of the user interface system, as opposed to individually apportioning restricted environment containers to a single dynamic interface element.

19. The computer-implemented method in accordance with claim 11, wherein at least one of the dynamic interface elements of the user interface system receiving a projected data object is a smaller window contained within a larger window, and wherein at least one other dynamic interface element of the user interface system receiving a projected data object is not contained within any other window of the user interface system.

20. The computer program product in accordance with claim 18, wherein the restricted environment container is an IFrame, and wherein data objects received by the dynamic interface elements are view models, and wherein a copy of the one or more data objects is maintained within a corresponding restricted environment container, and a synchronized second copy of the one or more data objects is maintained within the user interface system.

21. The computer program product in accordance with claim 18, wherein the computer-implemented method further comprises:

adding and removing dynamic interface elements to the user interface system.

22. The computer program product in accordance with claim 21, wherein the computer-implemented method further comprises:

instantiating a new restricted environment container when a user interface element is to be displayed that is to be populated by code from a particular extension application for which there is not yet a restricted environment container;

releasing user interface state of a dynamic interface element when the dynamic interface element is no longer displayed on the user interface system, but is still available at the user interface system; and releasing a restricted environment container corresponding to a particular extension application when the user interface system no longer has any user interface state corresponding to any dynamic interface element that is populated by the particular extension application.

23. The computer program product in accordance with claim 18, wherein at least one of the dynamic interface elements of the user interface system receiving a projected data object is a smaller window contained within a larger window, and wherein at least one other dynamic interface element of the user interface system receiving a projected data object is not contained within any other window of the user interface system.

\* \* \* \* \*